(12) United States Patent
Katou

(10) Patent No.: US 6,983,649 B2
(45) Date of Patent: Jan. 10, 2006

(54) TIRE CONDITION MONITORING APPARATUS

(75) Inventor: Michiya Katou, Ogaki (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 145 days.

(21) Appl. No.: 10/677,650

(22) Filed: Sep. 24, 2003

(65) Prior Publication Data

US 2004/0085199 A1    May 6, 2004

(30) Foreign Application Priority Data

Nov. 1, 2002  (JP) ............................ 2002-319692

(51) Int. Cl.
   *E01C 23/00*  (2006.01)
(52) U.S. Cl. .................. 73/146; 340/442; 340/447
(58) Field of Classification Search ................ 73/146, 73/442, 447
   See application file for complete search history.

(56) References Cited

U.S. PATENT DOCUMENTS

| | | | | |
|---|---|---|---|---|
| 3,796,990 A | * | 3/1974 | Hill | 340/447 |
| 3,806,869 A | * | 4/1974 | Davis, Jr. | 340/447 |
| 3,873,965 A | * | 3/1975 | Garcia | 340/447 |
| 6,304,172 B1 | * | 10/2001 | Katou et al. | 73/146.5 |
| 6,446,502 B1 | | 9/2002 | Normann et al. | 73/146.5 |
| 6,705,155 B2 | * | 3/2004 | Katou | 73/146 |
| 6,731,205 B2 | * | 5/2004 | Schofield et al. | 73/146.2 |
| 6,774,777 B2 | * | 8/2004 | Tsujita | 73/146.5 |
| 6,794,993 B1 | * | 9/2004 | Kessler et al. | 73/146.5 |
| 2002/0113692 A1 | * | 8/2002 | Normann et al. | 340/447 |
| 2004/0021562 A1 | * | 2/2004 | Prenninger | 340/445 |

FOREIGN PATENT DOCUMENTS

| | | |
|---|---|---|
| DE | DE19856861 A1 | 6/2000 |
| EP | 1215056 A2 | 6/2002 |
| JP | 10-104103 | 4/1998 |
| WO | WO01/69665 A1 | 9/2001 |

\* cited by examiner

*Primary Examiner*—William Oen
*Assistant Examiner*—Alandra Ellington
(74) *Attorney, Agent, or Firm*—Marsh Fischmann & Breyfogle LLP

(57) ABSTRACT

A transmitter is provided in each of tires to wirelessly transmit data representing the condition of the associated tire and data representing the direction of acceleration. A first reception antenna receives data from the transmitters provided in left and right front tires. A second reception antenna receives data from the transmitters provided in left and right rear tires. When receiving data from one of the transmitters, the receiver determines the position of the tire in which the transmitter that is the source of the data is provided based on the levels of received signals each sent from the first reception antenna and the second reception antenna.

12 Claims, 2 Drawing Sheets

Rotation Direction Of Tire Of Front Left Wheel (FL) When Vehicle Is Moving Forward

TIRE CONDITION MONITORING APPARATUS

BACKGROUND OF THE INVENTION

The present invention relates to a wireless tire condition monitoring apparatus that permits a driver in a vehicle passenger compartment to check the conditions of tires, such as the air pressure.

Wireless tire condition monitoring apparatuses that allow a driver in a vehicle passenger compartment to check the conditions of vehicle tires have been used. One such monitoring apparatus includes transmitters. Each transmitter detects condition, such as the pressure and the temperature, of an associated tire, and wirelessly transmits data representing the detected tire conditions. A receiver for receiving the data from the transmitters is provided on the vehicle body.

The transmitters are each provided in a tire attached to the vehicle. The receiver includes reception antennas each corresponding to one of the transmitters. Each reception antenna induces a voltage that corresponds to the electric field strength of radio waves transmitted from the corresponding transmitter. To obtain necessary data from voltage signals induced by the reception antennas, the receiver processes the voltage signals.

When receiving data, the receiver must distinguish which one of the transmitters has wirelessly sent the data. Accordingly, to distinguish one of the antennas that has the greatest level of induced voltage, in a prior art device disclosed in Japanese Laid-Open Patent Publication No. 10-104103, the receiver uses a multiplexer circuit to switch the reception antennas such that only one of the antennas is activated at a time. The antenna that is activated when the voltage signal level is highest is determined to be the closest one to the transmitter that has sent data. Thus, the positions of the tires are determined.

However, in the configuration of the prior art device, the number of the reception antennas must be equal to the number of the tires. Also, to increase the level of induced voltage, each reception antenna must be located in the vicinity of the corresponding tire, which limits the method for installing the antennas.

In addition, while awaiting signals from the transmitters, the multiplexer circuit must be kept activated to receive voltage signals from all the reception antennas. This increases power consumption.

Further, since only one of the reception antennas is activated at a time to distinguish the transmitters, the level of each obtained voltage signal is relatively low. Therefore, it is difficult to perform the distinction procedure of the transmitters accurately and reliably.

SUMMARY OF THE INVENTION

Accordingly, it is an objective of the present invention to provide a tire condition monitoring apparatus that is capable of determining the positions of tires.

To achieve the foregoing and other objectives and in accordance with the purpose of the present invention, a tire condition monitoring apparatus for monitoring conditions of tires is provided. The tires include left and right front tires provided at a front section of a vehicle and left and right rear tires provided at a rear section of the vehicle. The apparatus includes a plurality of transmitters, a first reception antenna, a second reception antenna, and a receiver. Each of the transmitters is provided in one of the tires. Each transmitter includes a condition detecting device for detecting the condition of the corresponding tire, and an acceleration detecting device for detecting the direction of acceleration accompanying rotation of the corresponding tire. Each transmitter wirelessly transmits data containing data representing the condition of the tire detected by the condition detecting device and data representing the direction of the acceleration detected by the acceleration detecting device. The first reception antenna is provided in the vehicle to correspond to the left and right front tires. The first reception antenna receives data from the transmitters of the left and right front tires. The second reception antenna is provided in the vehicle to correspond to the left and right rear tires. The second reception antenna receives data from the transmitters of the left and right rear tires. The receiver receives data from the transmitters. When receiving data from one of the transmitters, the receiver determines the position of the tire in which the transmitter that is the source of the data is provided based on the levels of received signals each sent from the first reception antenna and the second reception antenna.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus 1 according to one embodiment will now be described with reference to the drawings. The apparatus 1 is used in a vehicle such as an automobile.

Figure 1:
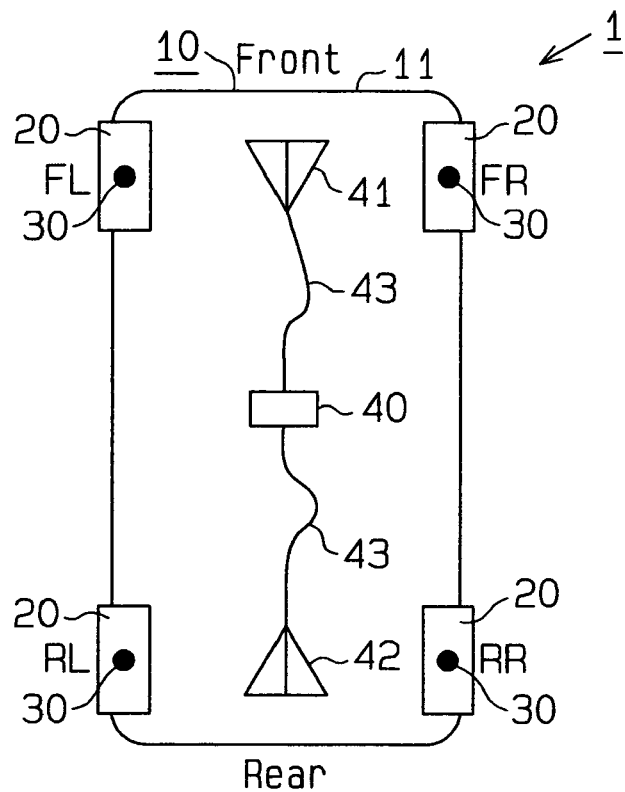
FIG. 1 is a diagrammatic view showing a tire condition monitoring apparatus according to one embodiment of the present invention.

As shown in FIG. 1, the tire condition monitoring apparatus 1 includes four transmitters 30 and a receiver 40. Each transmitter 30 is located in one of the tires 20 of a vehicle 10. The receiver 40 is located on a body frame 11 of the vehicle 10.

The vehicle 10 has left and right front wheels (FL, FR) and left and right rear wheels (RL, RR). Each tire 20 corresponds to one of the wheels (FL, FR, RL, RR).

Each transmitter 30 is located in the corresponding tire 20 and is fixed, for example, to the wheel of the tire 20. Each transmitter 30 measures the condition of the corresponding tire 20, that is, the pressure and the temperature of the tire 20. The transmitter 30 then wirelessly transmits data containing air pressure data and temperature data. The receiver 40 receives data that is wirelessly transmitted by the transmitters 30.

Figure 2:
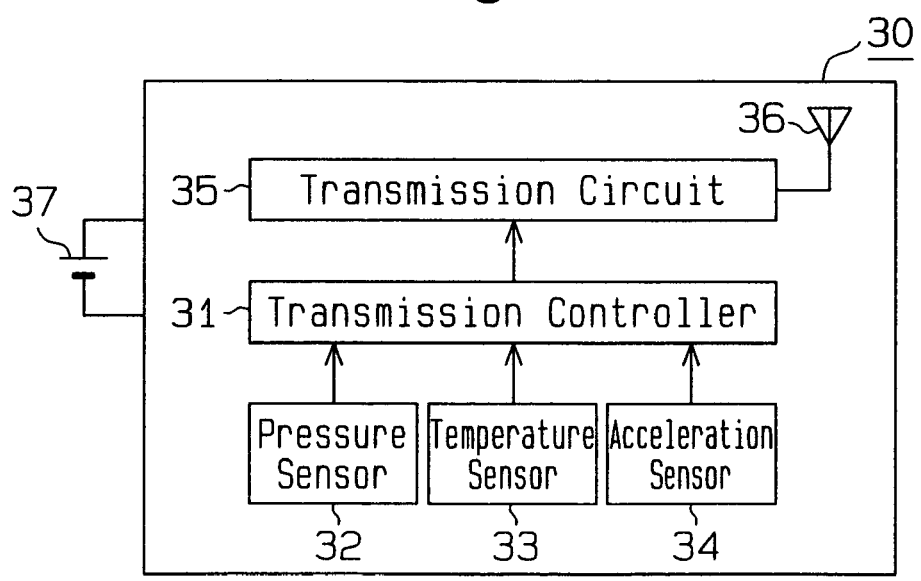
FIG. 2 is a block diagram showing one of the transmitters shown in FIG. 1.

As shown in FIG. 2, each transmitter 30 includes a transmission controller 31, which is a microcomputer. The transmission controller 31 includes, for example, a central processing unit (CPU), a read only memory (ROM), and a random access memory (RAM). A unique ID code is registered in an internal memory, for example, the ROM, of the transmission controller 31. The ID code is used to distinguish the associated transmitter 30 from the other three transmitters 30.

The tire pressure sensor 32 measures the air pressure in the interior of the associated tire 20 and provides the transmission controller 31 with pressure data, which is obtained from the measurement. The temperature sensor 33 measures the temperature in the interior of the associated tire 20 and provides the transmission controller 31 with temperature data, which is obtained from the measurement. The pressure sensors 32 and the temperature sensors 33 function as condition detecting means.

Each transmission controller 31 sends the air pressure data, the temperature data, and the registered ID code to a transmission circuit 35.

The transmission circuit 35 encodes and modulates the data sent from the transmission controller 31. The transmission circuit 35 then wirelessly sends the data to the receiver 40 through the antenna 36.

Each transmitter 30 is provided with a battery 37. The transmitter 30 is driven by electricity of the battery 37.

The transmission controller 31 of each transmitter 30 controls the pressure sensor 32 and the temperature sensor 33 to perform measurement at predetermined time intervals (for example, every 15 seconds). Also, the transmission controller 31 controls the transmission circuit 35 to perform periodic transmission every time the pressure sensor 32 completes a predetermined number of (for example, 40 cycles of) measurements. Further, when detecting an abnormality of the pressure in the tire 20 or of the temperature in the tire 20, the controller 31 causes the transmission circuit 35 to perform transmission irrespective of timing of the periodic transmission.

The timing of transmission of the transmitters 30 are regulated such that each transmitter 30 performs transmission at a timing different from those of the other transmitters 30. Therefore, two or more of the transmitters 30 do not perform transmission simultaneously.

Figure 3A:
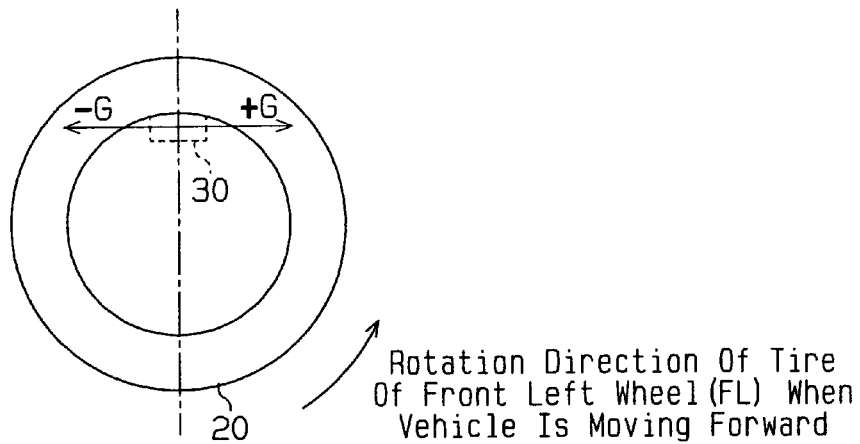
FIG. 3(a) is a diagram showing the direction of acceleration produced when a tire is rotated.

Each transmitter 30 has an acceleration sensor 34. As shown in FIG. 3(a), the acceleration sensor 34 outputs acceleration data to the transmission controller 31. The acceleration data represents the direction of acceleration based on the rotation direction of the corresponding tire 20.

For example, the tire 20 of the front left wheel FL outputs an acceleration data of +G to the transmission controller 31 when the vehicle 10 is moving forward, and outputs an acceleration data of −G to the transmission controller 31 when the vehicle 10 is moving rearward. Since the tire 20 of the front right wheel FR rotates in the reverse direction relative to rotation of the tire 20 of the front left wheel FL, the tire 20 of the front right wheel FR outputs an acceleration data of −G to the transmission controller 31 when the vehicle 10 is moving forward, and outputs an acceleration data of +G to the transmission controller 31 when the vehicle 10 is moving rearward. The tires 20 of the rear left wheel RL and the rear right wheel RR operate in the same manner as the front wheels FL and FR. Therefore, when receiving data from any of the transmitters 30, the receiver 40 is capable of determining whether the data has been sent from the tire 20 of one of the front and rear left wheels FL, RL or from the tire 20 of one of the front and rear right wheels FR, RR based on acceleration data of the acceleration sensor 34.

Each transmission controller 31 outputs acceleration data from the acceleration sensor 34 to the transmission circuit 35. Each transmission controller 31 outputs the inputted acceleration data to the transmission circuit 35. The transmission circuit 35 encodes and modulates the acceleration data sent from the transmission controller 31. The transmission circuit 35 then wirelessly sends the data through the antenna 36. That is, the transmission circuit 35 encodes and modulates the acceleration data together with the pressure data, the temperature data, and the ID code. The transmission circuit 35 then wirelessly sends the data through the antenna 36.

The receiver 40 will now be described with reference to FIGS. 1 and 4.

The receiver 40 is located at a predetermined position on the body frame 11 and is activated by electricity of a battery (not shown) of the vehicle 10.

As shown in FIG. 1, a front reception antenna 41 is located in a front section of the vehicle body frame 11 to substantially correspond to the tires 20 of the left and right front wheels (FL, FR). A rear reception antenna 42 is located in a rear section of the vehicle body frame 11 to substantially correspond to the tires 20 of the left and right rear wheels (RL, RR). The reception antennas 41, 42 are each connected to the receiver 40 with a cable 43.

Data that is wirelessly transmitted by the transmitters 30 is received by the reception antennas 41, 42. Each of the reception antennas 41, 42 induces a voltage that corresponds to the electric field strength of received radio waves, and outputs the induced voltage signal to the receiver 40. The level of voltage induced by each of the reception antennas 41, 42 varies depending on the arrangement of the transmitter 30 that has transmitted the radio waves relative to the antenna 41, 42. Therefore, when the transmitter 30 in the tire 20 of one of the front wheels FL, FR transmits radio waves, the front reception antenna 41 induces voltage having a higher level than that of voltage induced by the rear reception antenna 42. To contrast to this, when the transmitter 30 in the tire 20 of one of the rear wheels RL, RR transmits radio waves, the front reception antenna 41 induces voltage having a lower level than that of voltage induced by the rear reception antenna 42. As a result, based on the level of a received signal from the reception antennas 41, 42, the receiver 40 is capable of determining whether the transmitter 30 that has transmitted the signal corresponds to the tire 20 of one of the front wheels FL, FR or to the tire 20 of one of the rear wheels RL, RR.

Figure 4:
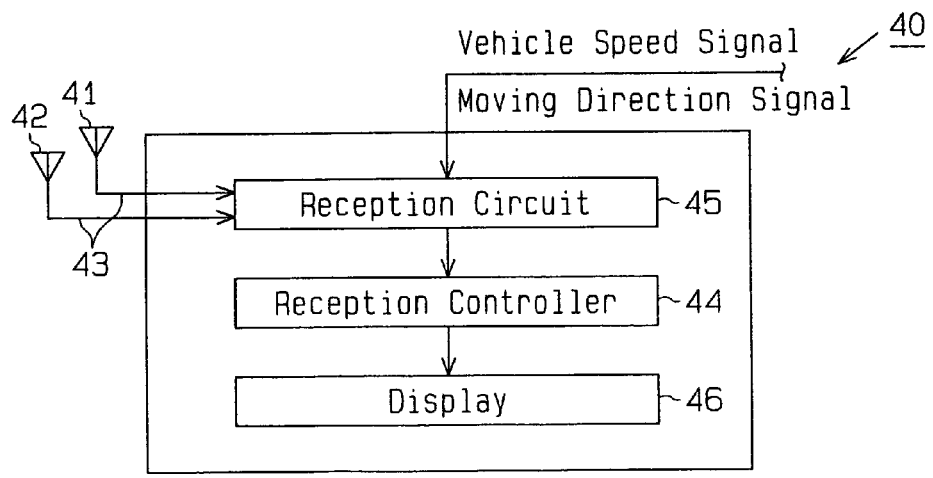
FIG. 4 is a block diagram showing a receptor.

As shown in FIG. 4, the receiver 40 includes a reception controller 44, a reception circuit 45, and a display 46. The reception controller 44 processes data received with the reception antennas 41, 42. The reception controller 44, which is, for example, a microcomputer, includes a CPU, a ROM, and a RAM. The reception circuit 45 receives data from the transmitters 30 through the reception antennas 41, 42. The reception circuit 45 demodulates and decodes the received data and sends the data to the reception controller 44.

Based on the levels of received signals sent from the reception antennas 41, 42 and acceleration data contained in the received data, the reception controller 44 determines which one of the tires 20 is associated with the transmitter 30 that is the source of the received data.

The reception controller 44 receives a signal representing the speed of the vehicle 10, or a vehicle speed signal, from, for example, a speedometer (not shown) provided at a predetermined position in the vehicle 10. The reception controller 44 also receives a signal representing the direction of movement of the vehicle 10, or a moving direction signal, from, for example, a transmission (not shown) provided at a predetermined position in the vehicle 10. The transmission outputs a signal representing the position of the shift lever as the moving direction signal to the reception controller 44. Based on the received moving direction signal, the reception controller 44 determines whether the vehicle 10 is moving forward or backward. The reception controller 44 determines that the vehicle 10 is moving backward only when the shift lever is at the reverse position. When the shift lever is at a position other than the reverse position, the reception controller 44 determines that the vehicle 10 is moving forward.

As a result, based on the vehicle speed signal and the moving direction signal, the reception controller 44 is capable of determining the rotating direction of the tires 20. Therefore, based on the acceleration data from the acceleration sensor 34, the vehicle speed signal, and the moving direction signal, the receiver 40 is capable of accurately determining whether received data has been sent from the tire 20 of one of the front and rear left wheels FL, RL or from the tire 20 of one of the front and rear right wheels FR, RR.

The reception controller 44 stores information regarding the position of the tire 20 associated with the transmitter 30 that has sent a signal, for example, in the RAM. Specifically, when storing the information of the position of the tire 20 corresponding to the transmitter 30 that has sent a signal with the ID code, the reception controller 44 associates the information with the ID code contained in the received data.

Based on the received data, the reception controller 44 obtains the pressure and the temperature of the tire 20 that is associated with the transmitter 30 that is the source of the received data. The reception controller 44 causes the display 46 to display data related to the pressure and the temperature of the tire 20 associated with the transmitter 30 that is the source of the received data. The reception controller 44 also causes the display 46 to display the position of the tire 20 corresponding to the data. Particularly, when there is an abnormality in the pressure of the tire 20, the reception controller 44 displays warning on the display 46. The display 46 functions as notifying means.

This embodiment has the following advantages.

(1) Each transmission circuit 35 wirelessly transmits the acceleration data as well as data representing the state of the corresponding tire 20. Therefore, the receiver 40 is capable of determining whether received data has been sent from the tire 20 of one of the front and rear left wheels FL, RL or from the tire 20 of the front and rear right wheels FR, RR based on acceleration data of the acceleration sensors 34. When the transmitter 30 of any one of the tires 20 transmits radio waves, the reception antennas 41, 42 receive the radio waves. At this time, the levels of voltage induced by the reception antennas 41, 42 are different. Therefore, based on the level of a received signal from the reception antennas 41, 42, the receiver 40 is capable of determining whether the transmitter 30 that is the source of the signal corresponds to the tire 20 of one of the front wheels FL, FR or to the tire 20 of one of the rear wheels RL, RR. Thus, the receiver 40 is capable of determining the position of the tire 20 that is associated with the transmitter 30 that is the source of the received data.

(2) The reception controller 44 receives the vehicle speed signal and the moving direction signal. Therefore, the receiver 40 is capable of obtaining the rotation direction of the tires 20 while the vehicle 10 is moving. As a result, the receiver 40 is capable of accurately determining whether the transmitter 30 that is the source of the signal corresponds to the tire 20 of one of the front and rear left wheels FL, RL or to the tire 20 of one of the front and rear right wheels FR, RR.

(3) The reception controller 44 stores information regarding the position of the tire 20 corresponding to the transmitter 30 that has sent a signal in the RAM. Therefore, when a new tire 20 is attached to the vehicle 10 or when the positions of the four tires 20 are changed, the receiver 40 is capable of determining the position of the tire 20 that is associated with the transmitter 30 that is the source of the received data. Thus, the reception controller 44 is capable of automatically storing information regarding the position of the tire 20 corresponding to the transmitter 30 that has sent a signal. An initial manual registration need not be performed.

It should be apparent to those skilled in the art that the present invention may be embodied in many other specific forms without departing from the spirit or scope of the invention. Particularly, it should be understood that the invention may be embodied in the following forms.

Figure 3B:
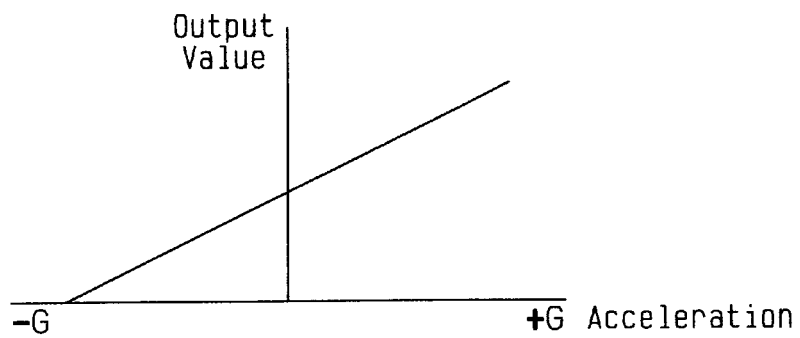
FIG. 3(b) is a graph showing the relationship of an output value relative to the magnitude of acceleration.

Instead of using the vehicle speed signal, the speed of the vehicle 10 may be determined according to the degree of the acceleration data from the acceleration sensors 34 as shown in FIG. 3(*b*). Specifically, the output value of the acceleration data is converted into the speed by an integration circuit to determine the speed of the vehicle 10. In this configuration, the rotation direction of the tires 20 is determined based on the speed of the vehicle 10 and a signal representing the position of the shift lever. Thus, the receiver 40 is capable of determining whether received data has been sent from the tire 20 of one of the front and rear left wheels FL, RL or from the tire 20 of one of the front and rear right wheels FR, RR.

As long as the source of received data is determined to be the transmitter 30 in the tire 20 of one of the front wheels FL, FR or the transmitter 30 in the tire 20 of one of the rear wheels RL, RR, the reception antennas 41, 42 may be provided at any positions in the vehicle body frame 11.

When there is an abnormality in the pressure or the temperature of the tire 20, the abnormality may be indicated by a sound. In addition, a speaker that is mounted on the vehicle 10 in advance may be used as an informing device.

The temperature sensor 33 may be omitted. In this case, the transmitter 30 has the minimum functions. This reduces the cost.

Air pressure data transmitted by the transmitter 30 may indicate the value of the air pressure or whether the air pressure is within a permissible range.

Other than four-wheeled vehicles, the present invention may be applied to multi-wheeled vehicles having four or more wheels, such as busses and towed vehicles, and to industrial vehicles, such as forklifts. When the present invention is applied to a towed vehicle, the receiver 40 and the display 46 are provided in the tractor.

Therefore, the present examples and embodiments are to be considered as illustrative and not restrictive and the invention is not to be limited to the details given herein, but may be modified within the scope and equivalence of the appended claims.

What is claimed is:

1. A tire condition monitoring apparatus for monitoring conditions of tires, the tires including left and right front tires provided at a front section of a vehicle and left and right rear tires provided at a rear section of the vehicle, the apparatus comprising:

a plurality of transmitters, each of which is provided in one of the tires, wherein each transmitter includes a condition detecting device for detecting the condition of the corresponding tire, and an acceleration detecting device for detecting the direction of acceleration accompanying rotation of the corresponding tire, wherein each transmitter wirelessly transmits data containing data representing the condition of the tire detected by the condition detecting device and data representing the direction of the acceleration detected by the acceleration detecting device;

a first reception antenna provided in the vehicle to correspond to the left and right front tires, wherein the first reception antenna receives data from the transmitters of the left and right front tires;

a second reception antenna provided in the vehicle to correspond to the left and right rear tires, wherein the second reception antenna receives data from the transmitters of the left and right rear tires; and a receiver that receives data from the transmitters, wherein, when receiving data from one of the transmitters, the receiver determines the position of the tire in which the transmitter that is the source of the data is provided based on the levels of received signals each sent from the first reception antenna and the second reception antenna.

2. The tire condition monitoring apparatus according to claim 1, wherein:

the receiver determines the rotation directions of the tires based on a speed and a moving direction of the vehicle.

3. The tire condition monitoring apparatus according to claim 1, wherein:

when receiving data from one of the transmitters, the receiver stores information of the position of the tire in which the transmitter is provided based on the levels of received signals each sent from the first reception antenna and the second reception antenna.

4. The tire condition monitoring apparatus according to claim 1, wherein the receiver determines a speed of the vehicle in accordance with the magnitude of the acceleration data from the acceleration detecting device, and wherein, based on the speed and the moving direction of the vehicle, the receiver determines the rotation directions of the tires.

5. The tire condition monitoring apparatus according to claim 1, wherein, based on the data representing the direction of the acceleration contained in the data from one of the transmitters, the receiver determines whether the transmitter that is the source of the data corresponds to one of the left tires or to one of the right tires, and wherein, based on the levels of received signals each sent from the first reception antenna and the second reception antenna, the receiver determines whether the transmitter that is the source of the data corresponds to one of the front tires or to one of the rear tires, thereby determining the position of the tire.

6. The tire condition monitoring apparatus according to claim 2, wherein the moving direction of the vehicle is based on a signal representing a position of a shift lever.

7. The tire condition monitoring apparatus according to claim 1, wherein, based on the data representing the direction of acceleration contained in the data from one of the transmitters and on the levels of received signals each sent from the first reception antenna and the second reception antenna, the receiver stores information of the position of the tire in which the transmitter is provided.

8. The tire condition monitoring apparatus according to claim 1, wherein the receiver includes a notifying device for notifying a passenger of the positions and the conditions of the tires.

9. A tire condition monitoring method for monitoring conditions of tires, the tires including left and right front tires provided at a front section of a vehicle and left and right rear tires provided at a rear section of the vehicle, the method comprising:

a first step including a condition detecting step for detecting the condition of each tire, and an acceleration detecting step for detecting the direction of acceleration accompanying rotation of the corresponding tire, wherein data containing data representing the detected condition of the tire and data representing the detected direction of the acceleration is wirelessly transmitted; and a second step, wherein, when the data of the first step is received, the position of the tire is determined based on the level of a signal related to the received data.

10. The tire condition monitoring method according to claim 9, further comprising:

a step in which, when the data of the first step is received, information of the position of the tire is stored based on the level of a signal related to the received data.

11. The tire condition monitoring method according to claim 9, wherein, in the second step, a speed of the vehicle is determined in accordance with the magnitude of the acceleration data, and the rotation directions of the tires are determined based on the speed and the moving direction of the vehicle.

12. The tire condition monitoring method according to claim 9, wherein, in second step, whether the data corresponds to one of the left tires or to one of the right tires is determined based on the data representing the direction of the acceleration, and, whether the data corresponds to one of the front tires or to one of the rear tires is determined based on the level of a signal related to the data.

* * * * *